UNITED STATES PATENT OFFICE.

HENRY LOWE, OF BALTIMORE, MARYLAND.

IMPROVEMENT IN PROCESSES OF RECOVERING SODA USED IN THE MANUFACTURE OF PAPER-STOCK.

Specification forming part of Letters Patent No. 38,953, dated December 17, 1861.

*To all whom it may concern:*

Be it known that I, HENRY LOWE, of the city and county of Baltimore, in the State of Maryland, have invented a mode of effecting economy in the production of fibrous matter when the use of caustic soda is resorted to for the purpose of dissolving soluble matter therefrom, of which the following is a specification.

My invention consists in reclaiming the soda from the spent solution of caustic soda after its action upon reeds, straw, or other fibrous material by precipitating the organic matter by the use of carbonic acid.

The following is a full description of the mode of making use of my invention.

Having drained the spent solution of caustic soda from the matter operated upon—say reeds or straw—from the process pursued by paper-makers, the solution is then cooled and furnished into a suitable vessel capable of bearing a pressure of two hundred pounds to the square inch, constructed on the same principle as the fountains used for the production of carbonic-acid water, (mineral water.) Fill the cylinder with the spent solution of caustic soda, the same as though the manufacture of carbonic-acid water was to be pursued. Attach the carbonic-acid pump, such as is used for the purpose of making carbonic-acid water. Drive the pump by power. If the carbonic acid were made by the decomposition of a carbonate by the use of acid, the process would be expensive. So I produce the carbonic acid by the process of Termin, Didot Bros., Sons & Co., of Paris, France, by the combustion of charcoal, or the process of M. Mauméné, as follows: In a retort containing about one hundred pounds of good whiting or chalk heated to redness inject a small finely-divided jet of steam. The disengagement of the gas takes place immediately. The quantity of gas given off is about one gallon per second. Although the gas is given off so rapidly and continuously, it is quite cold. It is only necessary to keep up the steam. To obtain two thousand gallons of gas requires the evaporation of four and one-half gallons of water. By the production of carbonic acid by this process it can be obtained in the cheapest manner, cold, and free from air and dust. Consequently is better than the decomposition by acid or the combustion of charcoal processes.

As a substitute for the chalk or whiting, the spent lime (carbonate of lime) from the conversion of the carbonate of soda to the caustic state may be made use of. By having properly-arranged retorts the drying of the carbonate of lime may be made to furnish the steam to decompose the red-hot carbonate, and vice versa, thus making a full economy of the heat. The lime resulting from the retorts, which will have become caustic, will do to decarbonate the soda. Every equivalent of caustic soda will require two equivalents of carbonic acid and an excess, so as to make the solution acid enough to make the operation complete—say, in all, three equivalents of carbonic acid to one of soda. Draw off the liquid into any suitable vessel and press the residuum. The residuum will do for the manufacture of papier-maché goods or for manure. If the spent liquor were boiled down and the soda reclaimed by destructive carbonization, it would be attended with the loss of the residuum as saved by me, and the expense of fuel to procure the soda is greater than the expense of the charcoal or carbonate of lime consumed by the method used by me. The solution of bicarbonate of soda being drained from the organic matter in any suitable manner, the said solution can be evaporated for the production of bicarbonate of soda or made recaustic with lime and used again for the same purpose as originally.

I am aware that sulphuric acid has been employed in paper-making for the purpose of precipitating soda from its solution, and I make no claim to such precipitation or to any new discovery in chemistry; but I believe my invention is an improvement in paper-manufacture, the same being more economical on account of the production of a carbonate of soda instead of a sulphate.

What I claim as my invention, and desire to secure by Letters Patent of the United States, is—

Reclaiming the soda from the spent solution of caustic soda after its action upon reeds, straw, or other fibrous material by charging the solution with carbonic-acid gas in a suitable vessel, so that the organic matter will be precipitated.

HENRY LOWE.

Witnesss:
LEWIS ADLER,
JAS. H. HARRIS.